(12) United States Patent
de Jong et al.

(10) Patent No.: US 11,435,520 B1
(45) Date of Patent: Sep. 6, 2022

(54) ELECTRONIC DEVICES WITH DAMAGE-RESISTANT DISPLAY COVER LAYERS

(71) Applicant: Apple Inc., Cupertino, CA (US)

(72) Inventors: Erik G. de Jong, San Francisco, CA (US); Christopher C. Bartlow, Menlo Park, CA (US); Christopher D. Jones, Los Gatos, CA (US); Michael B. Wittenberg, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 166 days.

(21) Appl. No.: 16/945,609

(22) Filed: Jul. 31, 2020

Related U.S. Application Data

(60) Provisional application No. 62/924,588, filed on Oct. 22, 2019.

(51) Int. Cl.
*G02B 6/06* (2006.01)
*G02B 1/14* (2015.01)

(52) U.S. Cl.
CPC ............... *G02B 6/06* (2013.01); *G02B 1/14* (2015.01)

(58) Field of Classification Search
CPC ..................................... G02B 1/14; G02B 6/06
See application file for complete search history.

(56) References Cited

U.S. PATENT DOCUMENTS

| | | | |
|---|---|---|---|
| 5,465,315 A * | 11/1995 | Sakai | G09F 9/305 385/116 |
| 5,609,952 A * | 3/1997 | Weiss | G01D 5/3537 385/115 |
| 7,910,207 B2 | 3/2011 | Kamiyama et al. | |
| 10,223,952 B2 | 3/2019 | Powell et al. | |
| 10,579,157 B1 | 3/2020 | Wilson | |
| 11,181,749 B2 * | 11/2021 | Karafin | G02B 30/56 |
| 2002/0097978 A1 * | 7/2002 | Lowry | G09F 9/305 385/115 |
| 2009/0092833 A1 * | 4/2009 | Schmitt | C08J 5/06 264/109 |
| 2014/0276111 A1 * | 9/2014 | Gal | G02B 23/26 600/478 |
| 2017/0139131 A1 | 5/2017 | Karafin et al. | |
| 2018/0128973 A1 | 5/2018 | Powell et al. | |
| 2019/0391326 A1 | 12/2019 | Yang et al. | |

FOREIGN PATENT DOCUMENTS

JP   4135993 B2 *   8/2008   ......... G02B 27/2271

* cited by examiner

*Primary Examiner* — Daniel Petkovsek
(74) *Attorney, Agent, or Firm* — Treyz Law Group, P.C.; G. Victor Treyz; Tianyi He

(57) ABSTRACT

An electronic device may have a display that displays an image and a display cover layer that overlaps the display. The display cover layer may have an image transport layer with an input surface that receives the image and a corresponding output surface to which the image is transported. The image transport layer may be formed from a coherent fiber bundle layer or a layer of Anderson localization material. The display cover layer may have a protective layer such as a protective glass layer that overlaps the image transport layer. A ring-shaped region of the display cover layer may have one or more structures with locally modified properties for arresting crack propagation across the display cover layer. The ring-shaped region may have one or more structures with locally reduced elasticity values or other structures that help arrest cracks.

20 Claims, 18 Drawing Sheets

ELECTRONIC DEVICES WITH DAMAGE-RESISTANT DISPLAY COVER LAYERS

This application claims the benefit of provisional patent application No. 62/924,588, filed Oct. 22, 2019, which is hereby incorporated by reference herein in its entirety.

FIELD

This relates generally to electronic devices, and, more particularly, to electronic devices with displays.

BACKGROUND

Electronic devices may have displays. Displays have arrays of pixels for displaying images for a user. The shape and other characteristics of many displays can pose challenges during integration of displays and other components into an electronic device, particularly in situations where space is limited.

SUMMARY

An electronic device may have a display that displays an image and a display cover layer that overlaps the display. The display cover layer may have an image transport layer with an input surface that receives the image and a corresponding output surface to which the image is transported. The image transport layer may be formed from a coherent fiber bundle layer or a layer of Anderson localization material. The display cover layer may have a protective layer such as a protective glass layer that overlaps the image transport layer.

A ring-shaped region of the display cover layer or other region of the display may have one or more structures with locally modified properties for arresting crack propagation across the display cover layer. This crack-arresting region may have one or more structures with locally reduced modulus of elasticity values or other structures that help prevent cracks from propagating laterally through the display cover layer in the event that the display cover layer is subject to damage from excessive force. The reduced modulus of elasticity structures or other crack-arresting structures may be formed in the image transport layer and/or in the protective layer overlapping the image transport layer. For example, binder in a coherent fiber bundle layer may be provided with locally reduced modulus values and/or a glass protective layer may have recesses filled with a reduced modulus material such as polymer.

To help enhance the strength of the image transport layer, the image transport layer may be chemically strengthened and/or thermally tempered. The tips of fiber cores in the fibers in a coherent fiber bundle layer may be provided with concave recesses filled with hard material to help strengthen the surface of the coherent fiber bundle layer. In some arrangements, fiber bundles may contain fibers with different diameters to enhance fiber bundle strength. Fibers in a fiber bundle may also be provided with serpentine shapes to help enhance the resistance of the fiber bundle to damage from an impact.

DETAILED DESCRIPTION

An electronic device may have a display. The display may have an array of pixels for creating an image. The image may pass through a display cover layer that overlaps the array of pixels. To minimize display borders or to otherwise create a desired appearance for the display, the display cover layer may include an image transport layer. The image transport layer may have an input surface that receives an image from the array of pixels and a corresponding output surface to which the image is transported from the input surface. A user viewing the image transport layer will view the image from the array of pixels as being located on the output surface.

In configurations in which the input and output surfaces have different shapes, the image transport layer may be used to warp the image produced by the array of pixels. For example, the shape of the image can transformed and the effective size of the image can be changed as the image passes through the image transport layer. In some configurations, edge portions of the image are stretched outwardly to help minimize display borders.

Image transport layers can be formed from coherent fiber bundles (sometimes referred to as fiber optic plates) and/or Anderson localization material. Glass and/or polymer may be used in forming image transport layer structures. To help protect the output surface of an image transport layer, an optional transparent protective layer may be included on the outer surface of the display cover layer. This transparent protective layer may be, for example, a glass plate or a protective layer formed from other transparent material such as clear polymer or sapphire or other crystalline materials. In some arrangements, image transport layers and/or protective layers can be formed over components other than displays.

When subjected to excessive force during a drop event, there is a risk of damage to the display cover layer. For example, there is a risk that a crack could form along one of the edges of the display cover layer. To prevent cracks from propagating through the display cover layer, the display cover layer may be provided with one or more crack-arresting regions.

Figure 1:
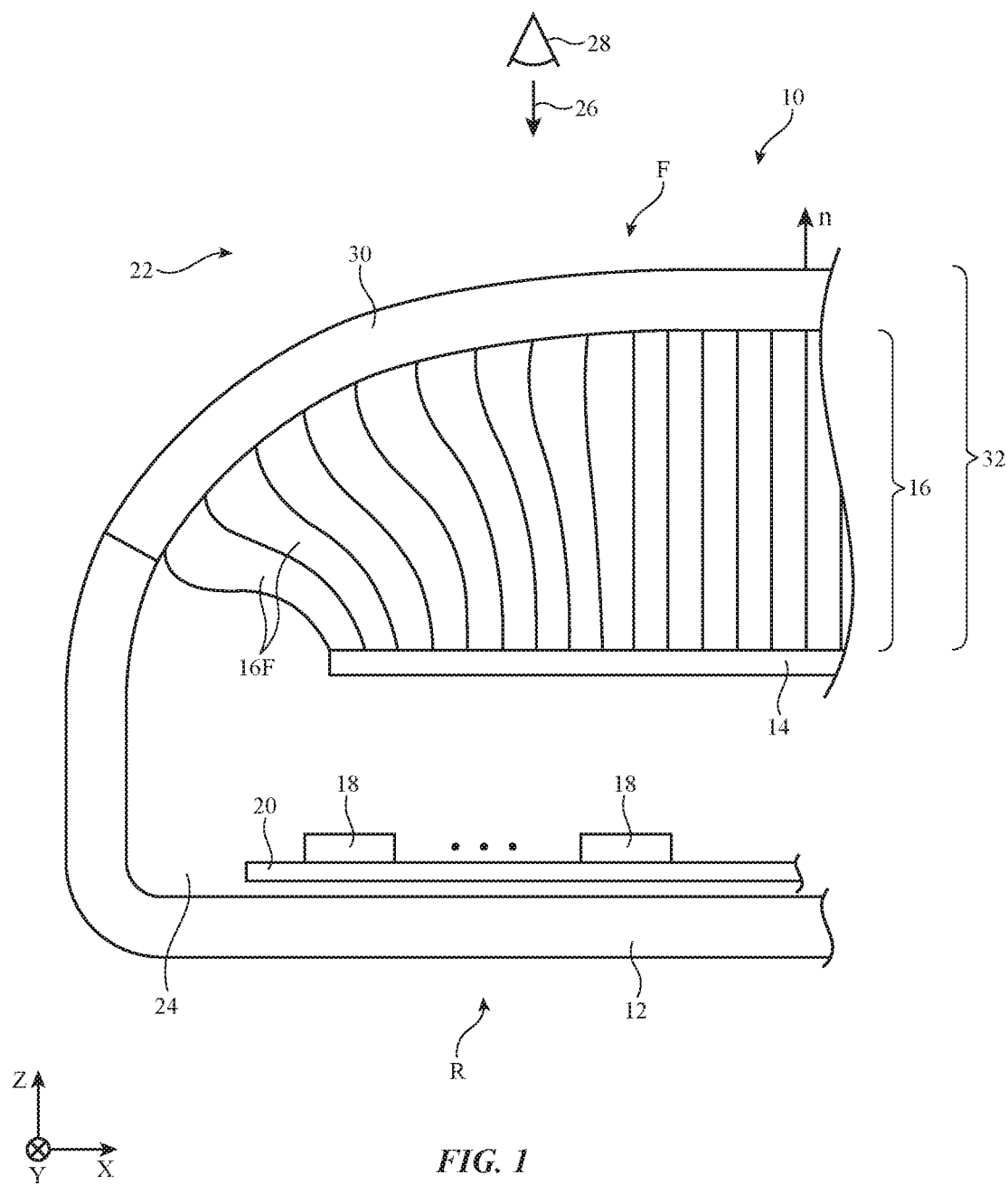
FIG. 1 is a side view of an illustrative electronic device with an image transport layer in accordance with an embodiment.

A cross-sectional side view of a portion of an illustrative electronic device with a display cover layer that includes an image transport layer is shown in FIG. 1. In the example of FIG. 1, device 10 is a portable device such as a cellular telephone, wristwatch, or tablet computer. In general, any type of electronic device may have an image transport layer such as a desktop computer, a voice-control speaker, a television or other non-portable display, a head-mounted device, an embedded system such as a system built into a vehicle or home, an electronic device accessory, and/or other electronic equipment.

Device 10 includes a housing such as housing 12. Housing 12 may be formed from polymer, metal, glass, crystalline material such as sapphire, ceramic, fabric, fibers, fiber composite material, natural materials such as wood and cotton, other materials, and/or combinations of such materials. Housing 12 may be configured to form housing walls. The housing walls may enclose one or more interior regions such as interior region 24 and may separate interior region 24 from exterior region 22. In some configurations, an opening may be formed in housing 12 for a data port, a power port, to accommodate audio components, or to accommodate other devices. Clear housing regions may be used to form optical component windows. Dielectric housing structures may be used to form radio-transparent areas for antennas and wireless power components.

Electrical components 18 may be mounted in interior region 24. Electrical components 18 may include integrated circuits, discrete components, light-emitting components, sensors, and/or other circuits and may, if desired, be interconnected using signal paths in one or more printed circuits such as printed circuit 20. If desired, one or more portions of the housing walls may be transparent (e.g., so that light associated with an image on a display or other light-emitting or light-detecting component can pass between interior region 24 and exterior region 22).

Electrical components 18 may include control circuitry. The control circuitry may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in the control circuitry may be used to control the operation of device 10. For example, the processing circuitry may use sensors and other input-output circuitry to gather input and to provide output and/or to transmit signals to external equipment. The processing circuitry may be based on one or more microprocessors, microcontrollers, digital signal processors, baseband processors, power management units, audio chips, application specific integrated circuits, etc. The control circuitry may include wired and/or wireless communications circuitry (e.g., antennas and associated radio-frequency transceiver circuitry such as cellular telephone communications circuitry, wireless local area network communications circuitry, etc.). The communications circuitry of the control circuitry may allow device 10 to communicate with other electronic devices. For example, the control circuitry (e.g., communications circuitry in the control circuitry) may be used to allow wired and/or wireless control commands and other communications to be conveyed between devices such as cellular telephones, tablet computers, laptop computers, desktop computers, head-mounted devices, handheld controllers, wristwatch devices, other wearable devices, keyboards, computer mice, remote controls, speakers, accessory displays, accessory cameras, and/or other electronic devices. Wireless communications circuitry may, for example, wirelessly transmit control signals and other information to external equipment in response to receiving user input or other input from sensors or other devices in components 18.

Input-output circuitry in components 18 of device 10 may be used to allow data to be supplied to device 10 and to allow data to be provided from device 10 to external devices. The input-output circuitry may include input devices that gather user input and other input and may include output devices that supply visual output, audible output, or other output.

Output may be provided using light-emitting diodes (e.g., crystalline semiconductor light-emitting diodes for status indicators and/or displays, organic light-emitting diodes in displays and other components), lasers, and other light-emitting devices, audio output devices (e.g., tone generators and/or speakers), haptic output devices (e.g., vibrators, electromagnetic actuators, piezoelectric actuators, and/or other equipment that supplies a user with haptic output), and other output devices.

The input-output circuitry of device 10 (e.g., the input-output circuitry of components 18) may include sensors. Sensors for device 10 may include force sensors (e.g., strain gauges, capacitive force sensors, resistive force sensors, etc.), audio sensors such as microphones, touch and/or proximity sensors such as capacitive sensors (e.g., a two-dimensional capacitive touch sensor integrated into a display, a two-dimensional capacitive touch sensor and/or a two-dimensional force sensor overlapping a display, and/or a touch sensor or force sensor that forms a button, trackpad, or other input device not associated with a display), and other sensors. Touch sensors for a display or for other touch components may be based on an array of capacitive touch sensor electrodes, acoustic touch sensor structures, resistive touch components, force-based touch sensor structures, a light-based touch sensor, or other suitable touch sensor arrangements. If desired, a display may have a force sensor for gathering force input (e.g., a two-dimensional force sensor may be used in gathering force input on a display).

If desired, the sensors may include optical sensors such as optical sensors that emit and detect light, optical touch sensors, optical proximity sensors, and/or other touch sensors and/or proximity sensors, monochromatic and color ambient light sensors, image sensors, fingerprint sensors, ultrasonic sensors, temperature sensors, sensors for measuring three-dimensional non-contact gestures ("air gestures"), pressure sensors, sensors for detecting position, orientation, and/or motion (e.g., accelerometers, magnetic sensors such as compass sensors, gyroscopes, and/or inertial measurement units that contain some or all of these sensors), health sensors, radio-frequency sensors (e.g., sensors that gather position information, three-dimensional radio-frequency images, and/or other information using radar principals or other radio-frequency sensing), depth sensors (e.g., structured light sensors and/or depth sensors based on stereo imaging devices), optical sensors such as self-mixing sensors and light detection and ranging (lidar) sensors that gather time-of-flight measurements, humidity sensors, moisture sensors, gaze tracking sensors, three-dimensional sensors (e.g., time-of-flight image sensors, pairs of two-dimensional image sensors that gather three-dimensional images using binocular vision, three-dimensional structured light sensors that emit an array of infrared light beams or other structured light using arrays of lasers or other light emitters and associated optical components and that capture images of the spots created as the beams illuminate target objects, and/or other three-dimensional image sensors), facial recognition sensors based on three-dimensional image sensors, and/or other sensors.

In some configurations, components 18 may include mechanical devices for gathering input (e.g., buttons, joysticks, scrolling wheels, key pads with movable keys, keyboards with movable keys, and other devices for gathering user input). During operation, device 10 may use sensors and/or other input-output devices in components 18 to gather user input (e.g., buttons may be used to gather button press input, touch and/or force sensors overlapping displays can be used for gathering user touch screen input and/or force input, touch pads and/or force sensors may be used in gathering touch and/or force input, microphones may be used for gathering audio input, etc.). The control circuitry of device 10 can then take action based on this gathered information (e.g., by transmitting the information over a wired or wireless path to external equipment, by supplying a user with output using a haptic output device, visual output device, an audio component, or other input-output device in housing 12, etc.).

If desired, electronic device 10 may include a battery or other energy storage device, connector ports for supporting wired communications with ancillary equipment and for receiving wired power, and other circuitry. In some configurations, device 10 may serve as an accessory and/or may include a wired and/or wireless accessory (e.g., a keyboard, computer mouse, remote control, trackpad, etc.).

Device 10 may include one or more displays such as display 14. The displays may, for example, include an organic light-emitting diode display, a liquid crystal display, a display having an array of pixels formed from respective light-emitting diodes (e.g., a pixel array having pixels with crystalline light-emitting diodes formed from respective light-emitting diode dies such as micro-light-emitting diode dies), and/or other displays. The displays may include rigid display structures and/or may be flexible displays. For example, a light-emitting diode display may have a polymer substrate that is sufficiently flexible to be bent. Display 14 may have a rectangular pixel array or a pixel array of another shape for displaying images for a user and may therefore sometimes be referred to as a pixel array. Display 14 may also sometimes be referred to as a display panel, display layer, or pixel layer. Each pixel array in device 10 may be mounted under a transparent housing structure (sometimes referred to as a transparent display cover layer).

In the example of FIG. 1, display (pixel array) 14 is mounted under display cover layer 32. Display cover layer 32 (which may be considered to form a portion of the housing of device 10), covers front face F of device 10. Configurations in which opposing rear face R of device 10 and/or sidewall portions of device 10 have transparent structures covering displays and other optical components may also be used.

As shown in FIG. 1, display cover layer 32 may include image transport layer 16 and protective layer 30. Protective layer 30 may be formed from a layer of glass, clear polymer, crystalline material such as sapphire or other crystalline material, and/or other transparent material. The presence of layer 30 may help protect the outer surface of layer 16 from scratches. If desired, layer 30 may be omitted (e.g., in configurations in which a thin-film protective coating is present on the outer surface of layer 16, in configurations in which layer 16 is formed from hard material such as glass, and/or in other configurations in which layer 16 is resistant to scratching). A layer of adhesive and/or other structures may be formed between protective layer 30 and image transport layer 16 and/or may be included elsewhere in the stack of layers on display 14.

During operation, the pixels of display 14 produce image light that passes through image transport layer 16. In configurations in which image transport layer 16 is formed from a coherent fiber bundle, image transport layer 16 has optical fibers 16F. The fibers or other optical structures of image transport layer structures such as image transport layer 16 transport light (e.g., image light and/or other light) from one surface (e.g., an input surface of layer 16 that faces display 14) to another (e.g., an output surface of layer 16 that faces viewer 28, who is viewing device 10 in direction 26). As the image presented to the input surface of layer 16 is transported to the output surface of layer 16, the integrity of the image light is preserved. This allows an image produced by an array of pixels to be transferred from an input surface of a first shape at a first location to an output surface with a different shape (e.g., a shape with a footprint that differs from that of the input surface, a shape with a curved cross-sectional profile, a shape with a region of compound curvature, and/or a shape with other desired features).

Image transport layer 16 may therefore move the location of an image and may optionally change the shape of the surface on which the image is presented. In effect, viewer 28 will view the image from display 14 as if the image were generated on the output surface of image transport layer 16. In arrangements in which the image from display 14 is warped (geometrically distorted) by image transport layer 16, digital pre-distortion techniques or other compensation techniques may be used to ensure that the final image viewed on the output surface of image transport layer 16 has a desired appearance. For example, the image on display 14 may be prewarped so that this prewarped image is warped by an equal and opposite amount upon passing through layer 16. In this way, the prewarped image is effectively unwarped by passage through layer 16 will not appear distorted on the output surface.

In configurations of the type shown in FIG. 1, device 10 may have four peripheral edges and a rectangular footprint when viewed in direction 26 or may have other suitable shapes. To help minimize the size of inactive display borders as a user is viewing front face F of device 10 as shown in FIG. 1, the shapes of fibers 16F along the periphery of layer 16 may be deformed outwardly as shown in FIG. 1. These fibers 16F each have an outwardly bent segment that bends away from surface normal n of the center of layer 30 (e.g., away from an axis parallel to the Z axis of FIG. 1) and each have an inwardly bent segment that bends back towards surface normal n to help direct output light towards viewer 28.

The deformed shapes of fibers 16F (and/or the corresponding deformations made to optical filaments in Anderson localization material in layer 16) may help distribute image light laterally outwards in the X-Y plane so that the effective size of display 14 is enlarged and the image produced by display 14 covers some or all of the sidewalls of housing 12 or other peripheral portions of device 10 when the image on front face F is being viewed by viewer 28. For example, the bent shapes of fibers 16F of FIG. 1 may help shift portion of the displayed image laterally outward in the X-Y plane along the edges and corners of device 10 to block the edges of device 10 from view. In some arrangements, the portions of fibers 16F at the outermost surface of layer 16 are oriented parallel or nearly parallel with viewing direction 26 and the Z axis of FIG. 1, which helps ensure that some or all of the light that has passed through layer 16 will travel in the Z direction and be viewable by viewer 28.

Figure 2:
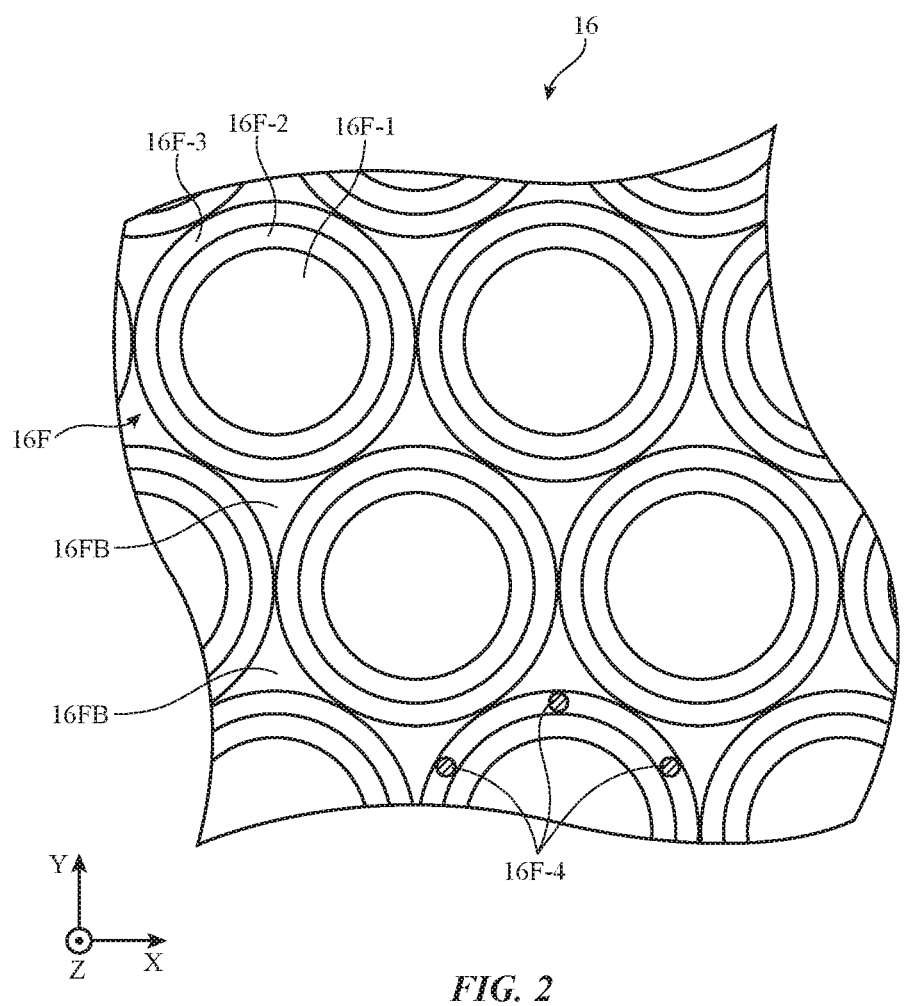
FIG. 2 is a cross-sectional view of a portion of an illustrative image transport layer formed using a coherent fiber bundle in accordance with an embodiment.

FIG. 2 is a cross-sectional view of a portion of image transport layer 16 in an illustrative configuration in which image transport layer 16 is formed from a coherent fiber bundle. Fibers 16F for layer 16 may have any suitable configuration. As shown in the example of FIG. 2, fibers 16F may each have a core such as core 16F-1. Cores 16F-1 and the other structures of image transport layer (e.g., cladding structures, binder, etc.) 16 may be formed from materials such as polymer, glass, crystalline material such as sapphire, and/or other materials. Some or all of these materials may be transparent. Arrangements in which some of the materials absorb light and/or have non-neutral colors or other light filtering properties may also be used.

Fiber cores 16F-1 may be formed from transparent material of a first refractive index and may be surrounded by cladding of a second, lower refractive index to promote light guiding in accordance with the principal of total internal reflection. In some arrangements, a single coating layer on cores 16F-1 may be used to form the cladding. In other arrangements, two or more coating layers on cores 16F-1 may be used to form the cladding. Clad fibers may be held together using binder 16FB, which serves to fill the interstitial spaces between the clad fibers and join fibers 16F together. In some configurations, stray light absorbing material may be incorporated into layer 16 (e.g., into some of the cores, cladding, and/or binder). The stray light absorbing material may be, for example, polymer, glass, or other material into which light-absorbing material such as dye and/or pigment has been incorporated.

In an illustrative configuration, layer 16 may have inner coating layers 16F-2 that are formed directly on the outer surfaces of cores 16F-1 and outer coating layers 16F-3 that are formed directly on the outer surfaces of layers 16F-2. Additional coating layers (e.g., three or more coating layers) or fewer coating layers (e.g., a single coating layer) may be formed on fiber cores 16F-1, if desired. Stray light-absorbing material may be used in layers 16F-2 and/or 16F-3 or other coating layer(s) on cores 16F-1. In an illustrative arrangement, layers 16F-2 and 16F-3, which may sometimes be referred to as forming first and second cladding portions (or first and second claddings) of the claddings for fiber cores 16F-1, may respectively be formed from transparent material and stray light-absorbing material. Other arrangements may be used, if desired (e.g., arrangements in which stray light absorbing material is incorporated into some or all of binder 16FB, arrangements in which cores 16F-1 are coated with inner and outer transparent claddings and an interposed intermediate stray-light-absorbing cladding, arrangements in which cores 16F-1 are covered with a single stray-light-absorbing cladding, arrangements in which some or all of fibers 16F are provided with longitudinally extending filaments 16F-4 of stray light absorbing material located, for example, on or in any of the cladding layers, etc.).

In configuration in which fibers 16F have claddings formed from two or more separate cladding layers, the cladding layers may have the same index of refraction or the outermost layers may have lower refractive index values (as examples). Binder 16FB may have a refractive index equal to the refractive index of the cladding material or lower than the refractive index of the cladding material to promote total internal reflection (as examples). For example, each fiber core 16F-1 may have a first index of refraction and the cladding material surrounding that core may have a second index of refraction that is lower than the first index of refraction by an index difference of at least 0.05, at least 0.1, at least 0.15, at least 10%, at least 20%, less than 50%, less than 30%, or other suitable amount. The binder refractive index may be the same as that of some or all of the cladding material or may be lower than the lowest refractive index of the cladding by an index difference of at least 0.05, at least 0.1, at least 0.15, at least 10%, at least 20%, less than 50%, less than 30%, or other suitable amount.

The diameters of cores 16F-1 may be, for example, at least 5 microns, at least 7 microns, at least 8 microns, at least 9 microns, less than 40 microns, less than 17 microns, less than 14 microns, less than 11 microns, or other suitable diameter. Fibers 16F (including cores and claddings) may have diameters of at least 6 microns, at least 7 microns, at least 8 microns, at least 9 microns, less than 50 microns, less than 17 microns, less than 14 microns, less than 11 microns, or other suitable diameter.

Fibers 16F may generally extend parallel to each other in image transport layer 16 (e.g., the fibers may run next to each other along the direction of light propagation through the fiber bundle). This allows image light or other light that is presented at the input surface to layer 16 to be conveyed to the output surface of layer 16.

If desired, image transport layer 16 may be formed from Anderson localization material in addition to or instead of fibers 16F. Anderson localization material is characterized by transversely random refractive index features (higher index regions and lower index regions) of about two wavelengths in lateral size that are configured to exhibit two-dimensional transverse Anderson localization of light (e.g., the light output from the display of device 10). These refractive index variations are longitudinally invariant (e.g., along the direction of light propagation, perpendicular to the surface normal of a layer of Anderson localization material).

Figure 3:
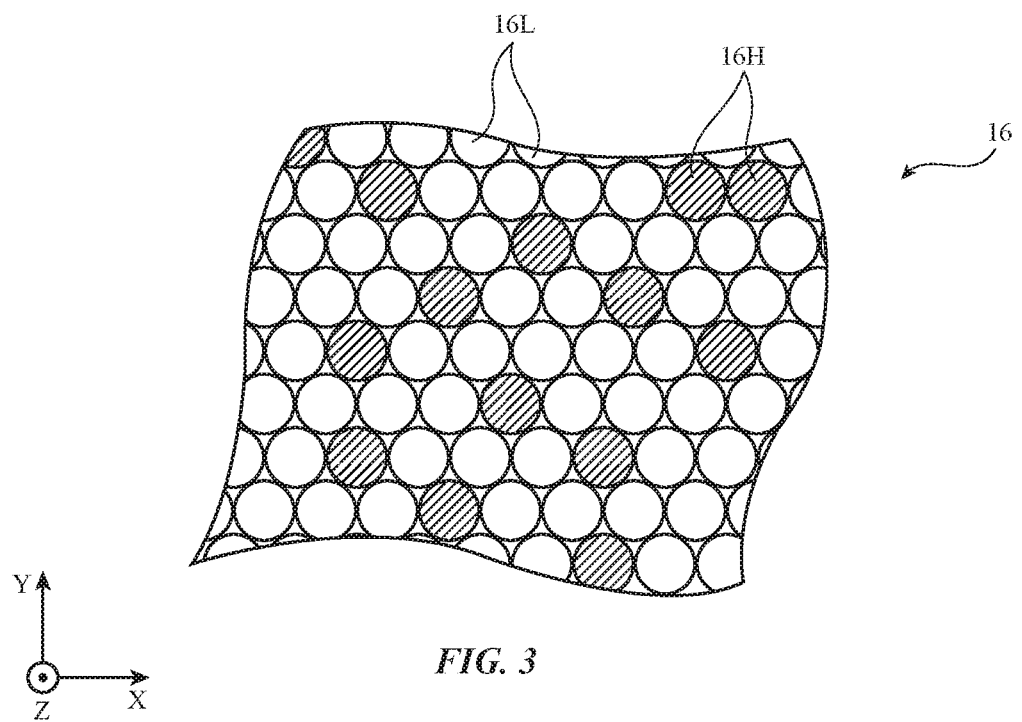
FIG. 3 is a cross-sectional view of a portion of an illustrative image transport layer formed using Anderson localization material in accordance with an embodiment.

FIG. 3 is a cross-sectional view of a portion of an image transport layer formed from Anderson localization material.

In the example of FIG. 3, image transport layer 16 includes a random (pseudorandom) set of elongated optical structures of different refractive index values. These structures may, for example, be optical filaments that run into and out of the page of FIG. 3 and that have different refractive index values such as first filaments 16H with higher refractive index values and second filaments 16L with lower refractive index values. The refractive indices of filaments 16L and 16H may differ by any suitable amount (e.g., by at least 0.05, at least 0.1, at least 0.2, at least 0.3, by less than 0.8, etc.). The filaments may be distributed laterally (in dimensions X and Y) with a random pattern and may have any suitable cross-sectional shape (circular, rectangular, etc.). Anderson localization material preforms can be formed by drawing and assembling individual filaments of different refractive index values into bundles and/or can be formed by extruding lengths of material that include laterally interspersed areas of different respective refractive index values. Preforms can then be formed into layer 16 using one or more fusing and drawing operations. Other fabrication techniques may be used, if desired. To absorb stray light within an image transport layer formed from Anderson localization material, the Anderson localization material may include light absorbing material (e.g., light-absorbing filaments interspersed with transparent filaments or other light-absorbing structures).

Figure 4:
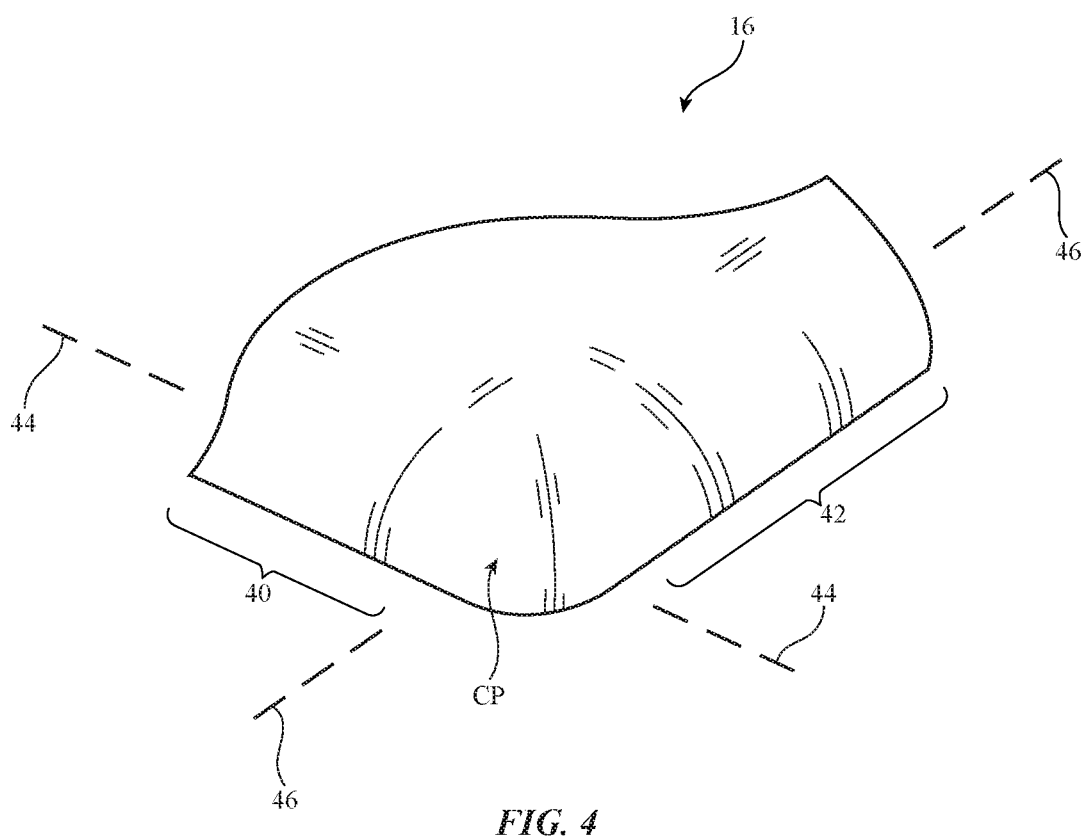
FIG. 4 is a perspective view of a portion of an image transport layer surface with compound curvature in accordance with an embodiment.

Image transport layers can be used to transport an image from a first surface (e.g., the surface of a pixel array) to a second surface (e.g., a surface in device 10 with compound curvature or other curved and/or planar surface shape) while preserving the integrity of the image. A perspective view of an illustrative corner portion of image transport layer 16 is shown in FIG. 4. In the example of FIG. 4, device 10 has edge portions 40 and 42 with surfaces that curve about axes 44 and 46, respectively. These portions of layer 16 may extend parallel to the straight sides of device 10 (as an example) and are characterized by curved surfaces that can be flattened into a plane without distortion (sometimes referred to as developable surfaces). At the corner of image transport layer 16 of FIG. 4, image transport layer 16 has curved surface portions CP with compound curvature (e.g., a surface that can only be flattened into a plane with distortion, sometimes referred to as a surface with Gaussian curvature). In a rectangular layout with curved corners, image transport layer 16 may have four corners with compound curvature. Image transport layers of other shapes (e.g., circular outlines, etc.) may also have surfaces with compound curvature (e.g., dome-shaped surfaces). When overlapped by protective layer 30, the overlapping portions of protective layer 30 may have corresponding surfaces with compound curvature. When selecting the size and shape of the output surface of layer 16 and therefore the size and shape of the image presented on the output surface, the use of an image transport layer material with compound curvature can provide design flexibility.

Figure 5:
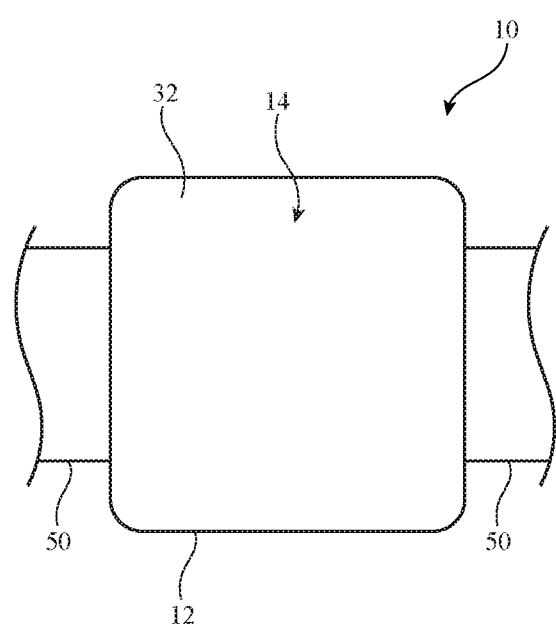
FIG. 5 is a top view of an illustrative electronic device in accordance with an embodiment.

In some arrangements, device 10 may include support structures such as wearable support structures. This allows device 10 to be worn on a body part of a user (e.g., the user's wrist, arm, head, leg, or other portion of the user's body). As an example, device 10 may include a wearable band, such as band 50 of FIG. 5. Band 50, which may sometimes be referred to as a wristband, wrist strap, or wristwatch band, may be formed from polymer, metal, fabric, leather or other natural materials, and/or other material, may have links, may stretch, may be attached to housing 12 in a fixed arrangement, may be detachably coupled to housing 12, may have a single segment or multiple segments joined by a clasp, and/or may have other features that facilitate the wearing of device 10 on a user's wrist.

During use of device 10, a user may inadvertently drop device 10. During a drop event, device 10 and display cover layer 32 may sharply impact an external object. Drop events and other events that impose excessive force on display cover layer 32 therefore present a risk of damage to display cover layer 32.

Figure 6:
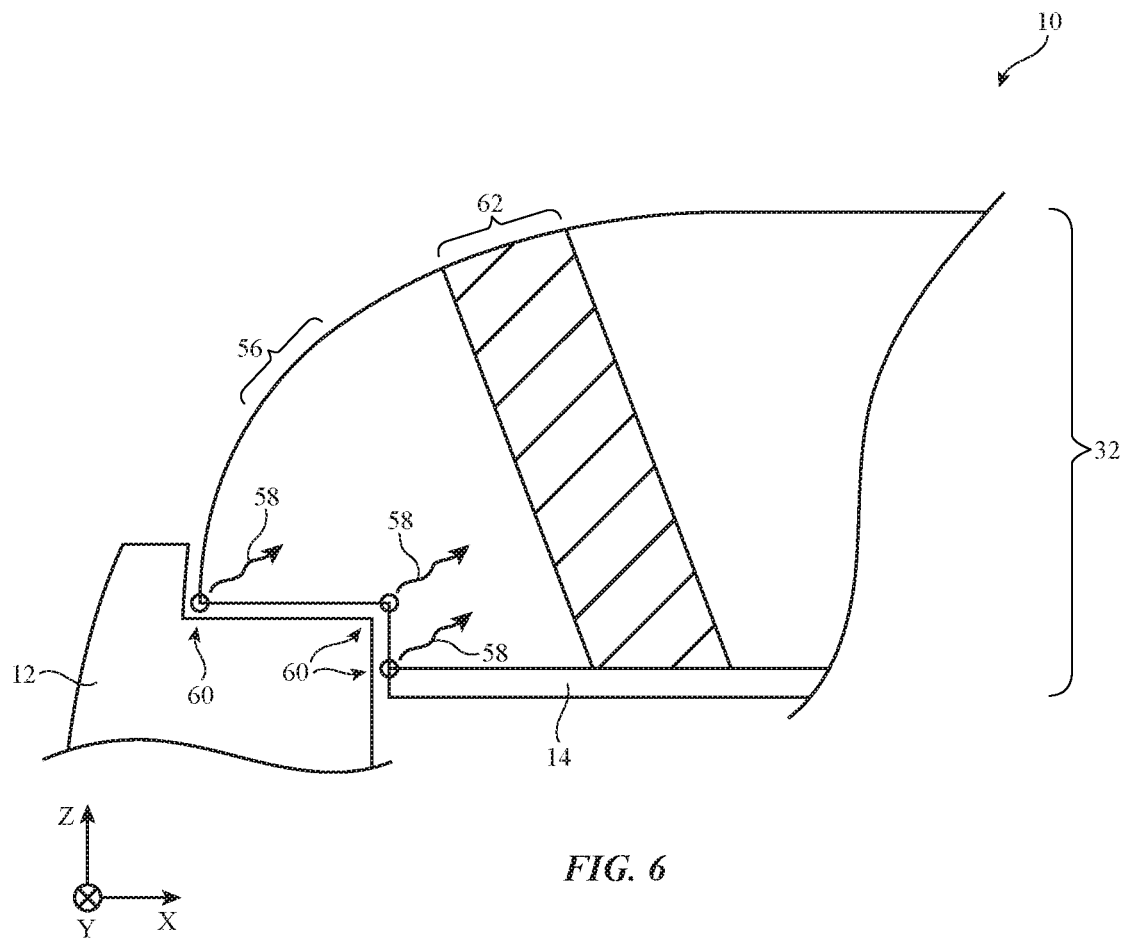
FIG. 6 is a cross-sectional side view of an illustrative display cover layer in accordance with an embodiment.

FIG. 6 is a cross-sectional side view of device 10 in an illustrative configuration in which display 14 is covered with a display cover layer. Display cover layer 32 of FIG. 6 includes an image transport layer such as image transport layer 16 of FIG. 1 and optionally includes a protective layer such as protective layer 30 of FIG. 1. During a drop event, display cover layer 32 may be contacted by an external object. The external object may, as an example, strike layer 32 near one of the corners or edges of device 10 (see, e.g., illustrative impact location 56 on the edge surface of layer 32). As a result of excessive force from contact with an external object, there is a risk that one or more cracks 58 will develop in layer 32. Cracks might, as an example, be initiated at location such as locations 60 of layer 32, where the surface of layer 32 is characterized by a sharp bend and where stress tends to be concentrated. After being initiated at locations 60, there is a risk that cracks 58 might propagate laterally through layer 32 (e.g., roughly parallel to the X-Y plane of FIG. 6), potentially leading to larger cracks that extend long distances across layer 32.

To avoid undesired crack propagation, layer 32 may be provided with one or more crack-arresting regions such as region 62 of FIG. 6. In region 62, one or more portions of layer 32 may be configured to help block crack propagation. As an example, region 62 may contain one or more materials with locally reduced modulus of elasticity values or other structure(s) that prevent cracks from propagating. If, as an example, glass in layer 32 has a Young's modulus of about 70, region 62 may contain material with a locally reduced Young's modulus of 20-30. In general, the lower modulus structures in layer 32 may have a modulus of elasticity that is less than 90% that of the higher modulus structures in layer 32 or that is less than 70%, less than 40%, less than 25%, or other suitable fraction of the modulus of the higher modulus structures in layer 32 (as examples). The material of reduced modulus in region 62 may be binder (see, e.g., binder 16FB of FIG. 2 and/or other material (e.g., fiber core material, cladding, etc.). In general, layer 32 may have structures of any suitable elastic modulus values and region 62 may contain structures with any suitable locally reduced elastic modulus values or other structures configured to help block crack propagation. The reduced modulus material may be formed in image transport layer 16 and/or, if present, in protective layer 30. When a crack that has been initiated at a location such as locations 60 of FIG. 6 begins to propagate across layer 32, the crack will stop propagating upon reaching region 62, due to the ductile nature of some or all of the structures in region 62 of layer 32. In this way, cracks from excessive drop event forces can be confined to peripheral regions of display cover layer 32 where they are less noticeable to a user.

Figure 7:
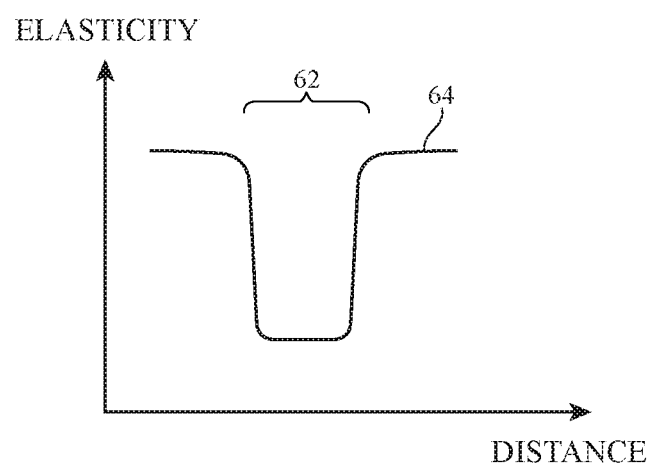
FIG. 7 is a graph showing how a portion of a display cover layer may be provided with a reduced elastic modulus to help arrest cracks in accordance with an embodiment.

FIG. 7 is a graph in which the elasticity of one or more materials in layer 32 has been plotted as a function of lateral distance across layer 32. As shown by curve 64 in the graph of FIG. 7, the modulus of elasticity of layer 32 may be locally reduced (reduced relative to remaining portions of layer 32) in region 62.

Figure 8:
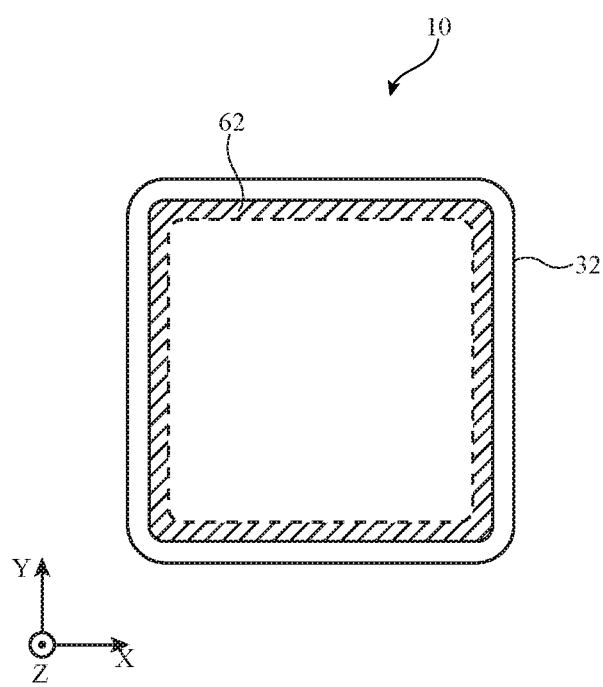
FIG. 8 is a top view of an illustrative display cover layer with a ring-shaped region of reduced elastic modulus to arrest cracks in accordance with an embodiment.

FIG. 8 is a top view of device 10 in an illustrative configuration in which region 62 has a rectangular ring shape (e.g., a rectangular ring shape with curved corners) that extends parallel to the peripheral edge of display cover layer 32. As shown in FIG. 8, region 62 may be formed slightly inward from the outermost peripheral edge of layer 32 (as an example). In general, region 62 may have any suitable ring shape (e.g., circular, oval, square with rounded edges, rectangular with curved or straight edges, shapes with straight segments and/or curved segments, etc.). Ring-shaped regions such as region 62 of FIG. 8 may be located near the periphery of device 10 and therefore are sometimes referred to as peripheral rings or peripheral ring-shaped crack-arresting regions.

Figure 9:
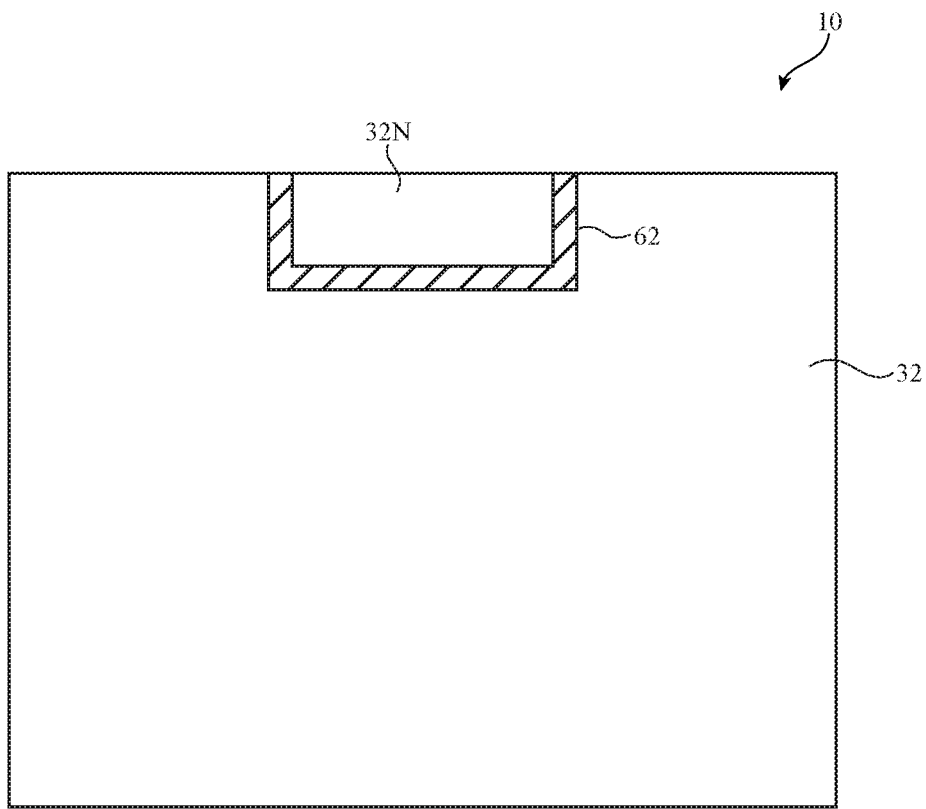
FIG. 9 is a top view of an illustrative display cover layer with a strip of reduced elastic modulus that runs along an edge of a notch-shaped region in accordance with an embodiment.

FIG. 9 shows how region 62 may have a U-shape or other shape that runs along the edge of a notch-shaped portion of layer 32 (e.g., notch-shaped portion 32N). Region 62 may have an elongated shape that has one or more straight segments and/or one or more curved segments. In arrangements of the type shown in FIG. 9, region 62 may help prevent crack propagation into region 32N, thereby helping to protect sensors and other components in region 32N from interference from cracks.

Figure 10:
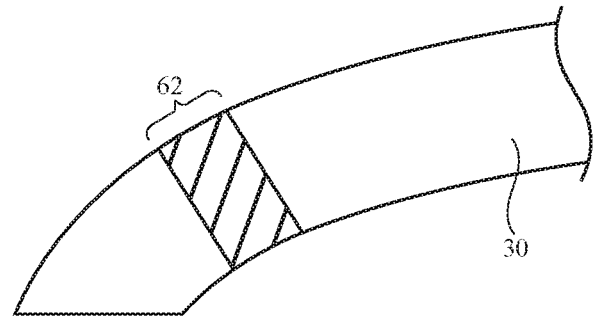
FIG. 10 is a cross-sectional side view of an illustrative protective layer with a region of reduced elastic modulus in accordance with an embodiment.
Figure 11:
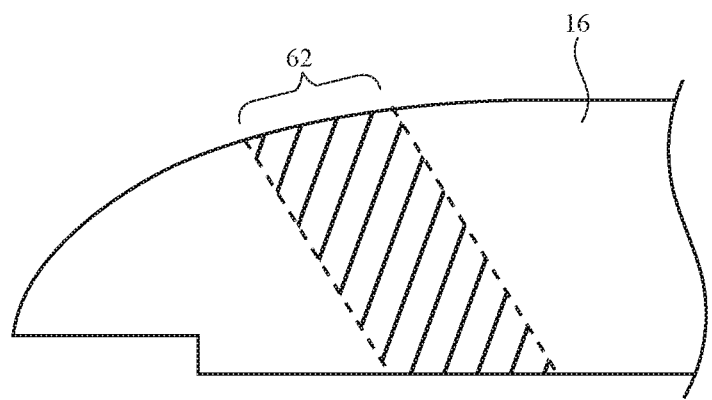
FIG. 11 is a cross-sectional side view of an illustrative image transport layer with a region of reduced elastic modulus or other structures to arrest crack propagation in accordance with an embodiment.

FIG. 10 is a cross-sectional side view of protective layer 30 showing how a portion of layer 30 may have a locally reduced elastic modulus, thereby forming crack arresting region 62 in layer 30. Layer 30 may, as an example, be formed from glass and may have a recess (e.g., a ring-shaped groove) that is filled with a lower modulus material such as polymer. As shown in FIG. 11, some or all of crack arresting region 62 may be formed in a peripheral portion of image transport layer 16. Image transport layer 16 may be modified in region 62 to exhibit a locally reduced elastic modulus and/or other locally modified properties that help prevent crack propagation. In arrangements in which layer 32 includes a glass protective layer or other protective layer overlapping an image transport layer, crack-arresting structures (e.g., structures with locally reduced elastic modulus) may be formed in the protective layer (e.g., from a polymer-filled recess in a glass protective layer), in the image transport layer, or in both the protective layer and the image transport layer. As an example, a protective layer may be provided with a crack-arresting structure that is aligned with and that overlaps a crack-arresting structure in an image transport layer (e.g., the protective layer crack-arresting structure and the image transport layer crack-arresting layer may overlap and be located in a common crack-arresting region associated with layer 16, layer 30, and layer 32).

Figure 12:
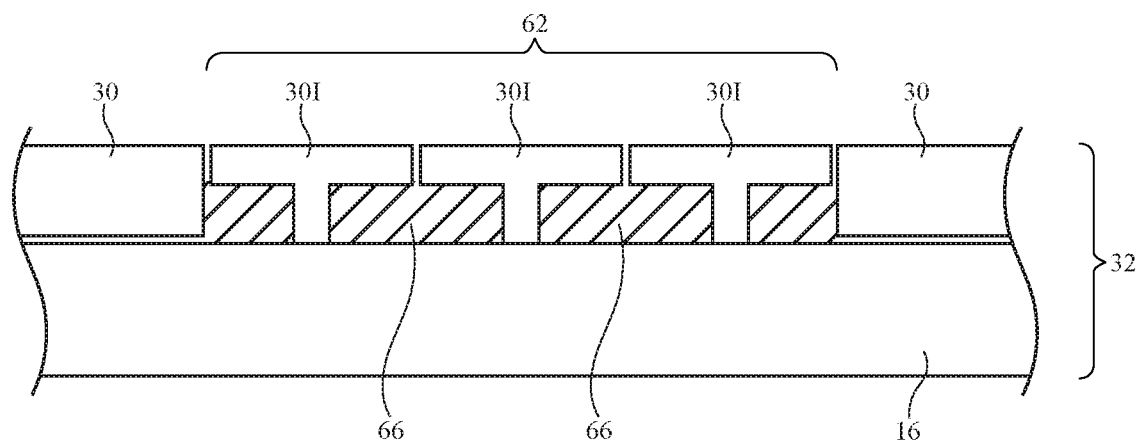
FIG. 12 is a cross-sectional side view of an illustrative display cover layer having a protective layer with a region with recesses filled with polymer or other low modulus material to help prevent crack propagation in accordance with an embodiment.

Protective layer 30 may have sacrificial structures in region 62. Consider, as an example, the illustrative arrangement of FIG. 12. As shown in FIG. 12, protective layer 30 may be formed from a solid layer of material (e.g., a solid glass layer) outside of region 62. In region 62, layer 30 may have an array of tiles 30I each of which is supported by a respective pillar that bears against the outer surface of image transport layer 16. Protective layer 30 of FIG. 12 has recesses under the pillars that is filled with polymer (e.g., adhesive) that has an elasticity that is less than the glass or other material of layer 30. As shown in FIG. 12, adhesive 66 may be used to attach each tile 30I to layer 16. In the absence of cracks, tiles 30I will form a smooth exterior surface for layer 30 that lies flush with layer 30. In the presence of a propagating crack, adhesive 66 and the separations between adjacent tiles 30I will block further crack propagation within layer 30.

Figure 13:
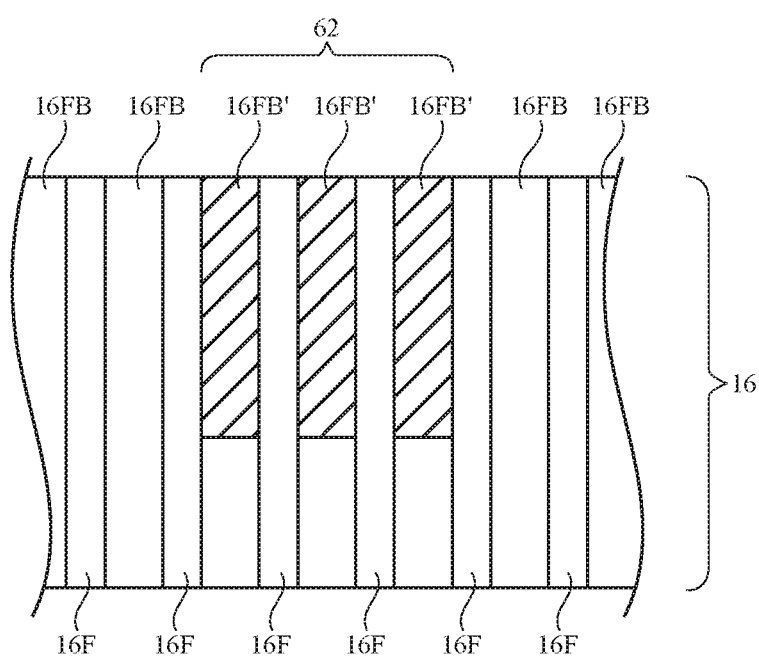
FIG. 13 is a cross-sectional side view of an illustrative image transport layer with a region of selectively softened binder for helping to arrest cracks in accordance with an embodiment.

If desired, portions of image transport layer 16 may be processed to locally reduce the elastic modulus of one or more materials in layer 16. As shown in the cross-sectional side view of image transport layer 16 of FIG. 13, for example, image transport layer 16 may be formed from fibers 16F joined with binder 16FB. In region 62, portions of binder 16FB may be selectively removed and backfilled with binder 16FB' that has a lower modulus of elasticity than binder 16FB. When a crack reaches region 62, the low elasticity of binder 16FB' will help block crack propagation across layer 16.

Figure 14:
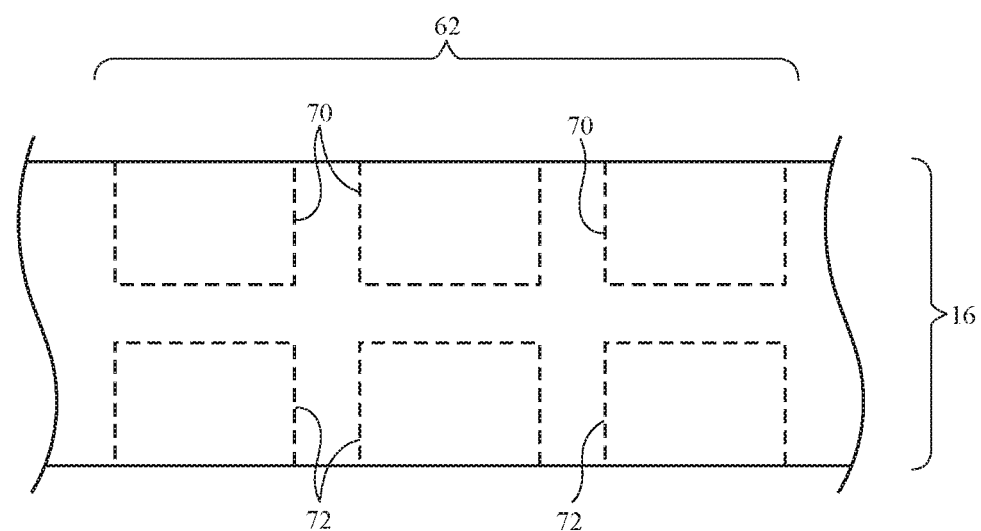
FIG. 14 is a cross-sectional side view of an illustrative image transport layer showing illustrative regions that may be modified to help arrest cracks in accordance with an embodiment.

FIG. 14 is a cross-sectional side view of image transport layer 16 showing how one or more illustrative regions 72 on the underside of layer 16 and/or one or more illustrative regions 70 on the upper surface of layer 16 may be provided with crack arresting materials. Regions 72 and/or 70 may have ring shapes (e.g., shapes that run along the periphery of device 10) or other shapes. Region 62 may be formed in layer 16 by forming regions 70 and/or regions 72 from materials with locally reduced modulus of elasticity values relative to other portions of layer 16. For example, the binder in regions 70 and/or 72 may have a locally reduced modulus of elasticity.

Figure 15:
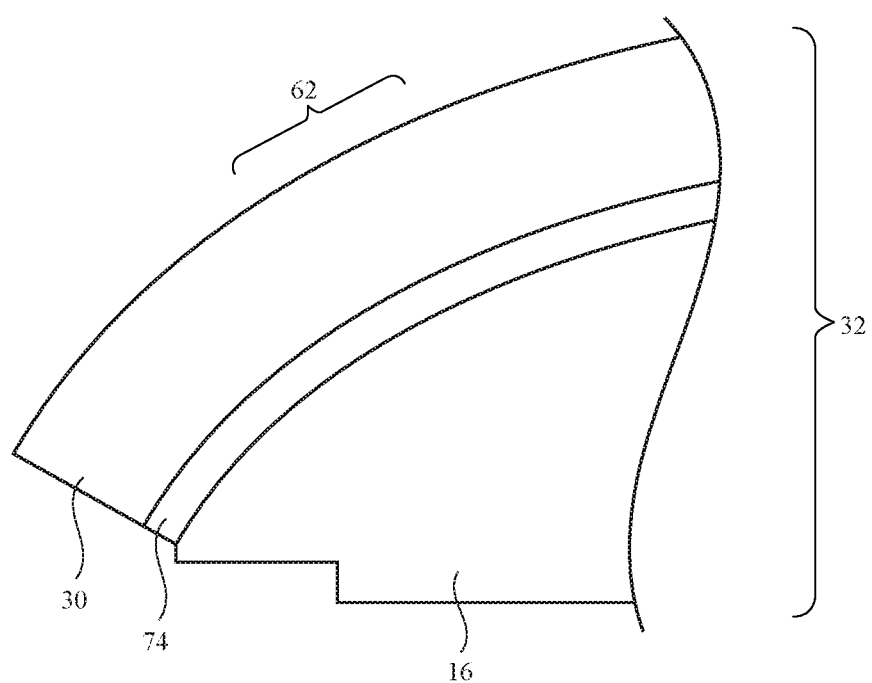
FIG. 15 is a cross-sectional side view of an illustrative display cover layer with an adhesive layer in accordance with an embodiment.

FIG. 15 shows how a layer on adhesive such as adhesive 74 may be formed between the inner surface of protective layer 30 and the corresponding outer surface (output surface) of image transport layer 16. Adhesive 74 may be formed from a polymer with a low elastic modulus (e.g., a modulus lower than that of some or all of the structures in layer 30 and/or layer 16) and may therefore help prevent crack propagation. If desired, one or more portions of adhesive 74 may be provided with locally reduced elasticity values relative to remaining portions of adhesive 74 (e.g., in region 62).

Figure 16:
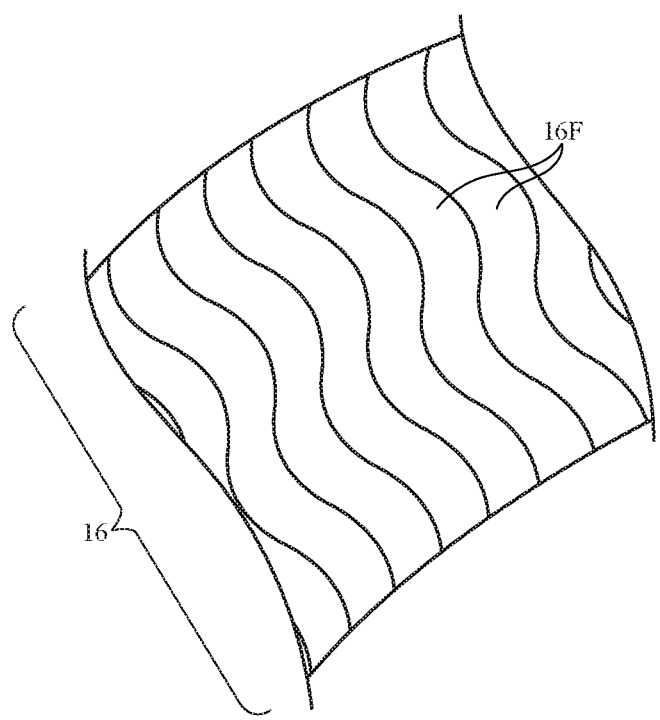
FIG. 16 is a cross-sectional side view of an illustrative image transport layer with serpentine fibers in accordance with an embodiment.

The ability of fibers 16F to absorb stress along their lengths without cracking may be enhanced by creating multiple bends along their lengths (e.g., two or more, three or more, four or more, etc.). As shown in the cross-sectional side view of FIG. 16, for example, fibers 16F in layer 16 may have serpentine shapes (e.g., each fibers 16F may extend along a parallel serpentine path between the input and output surface of layer 16). The serpentine shapes of fibers 16F may help layer 16 accommodate stress from a drop event without cracking.

Figure 17:
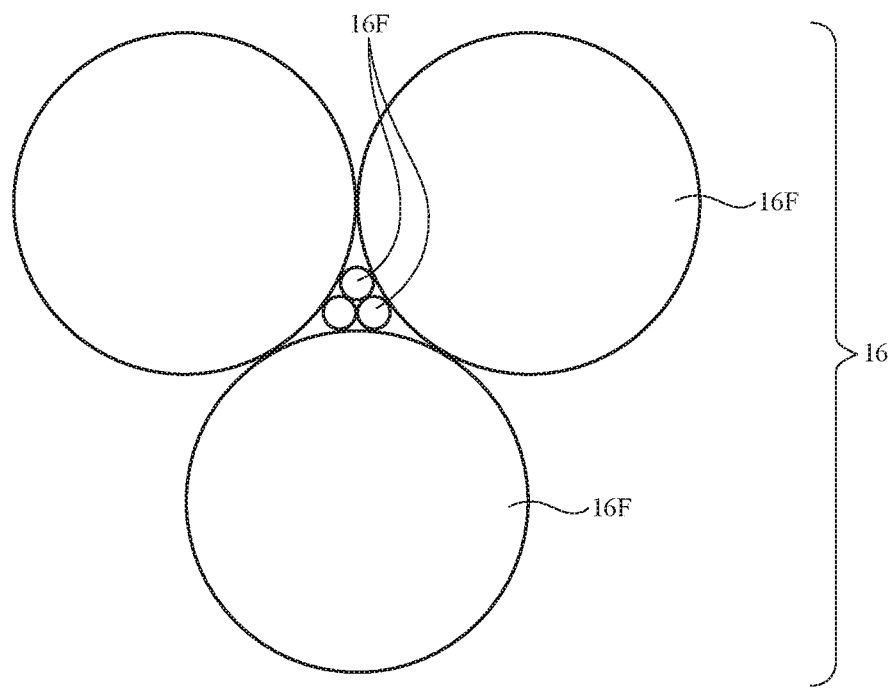
FIG. 17 is a cross-sectional view of an illustrative image transport layer having fibers of different diameters to increase strength and help arrest cracks in accordance with an embodiment.

As shown in FIG. 17, image transport layer 16 may include fibers 16F with different diameters. Image transport layer 16 may, as an example, include larger fibers 16F and smaller fibers 16F that fit into gaps between the larger fibers. In other configurations, layer 16 may contain three or more, four or more, or other suitable numbers of fibers 16F of different sizes. The inclusion of fibers 16F of different diameters within layer 16F may enhance the packing density of fibers 16F within layer 16 (e.g., more fiber core area may be present per unit area on layer 16). As a crack begins to propagate through the larger fibers 16F of FIG. 17, the crack will tend to follow a path of least resistance between these larger fibers. In the absence of smaller fibers in a gap between larger fibers, a crack could propagate along a path extending directly across the gap. In the presence of smaller fibers packed within the gap, the propagating crack will be forced to follow an indirect path around the smaller fibers, rather than the direct path across the gap. Formation of a crack along the longer meandering path requires more energy than formation of a crack along the direct path, so inclusion of the smaller fibers in layer 16 will help make crack formation less likely for a given impact. The multi-dimensional fiber packing arrangement of FIG. 7 may be used throughout layer 16 or one or more regions of layer 16 (e.g., region 62) may be provided with fibers of two or more dimensions, whereas remaining portions of layer 16 contain only fibers of a single dimension (or at least contain a smaller number of different fiber sizes).

Figure 18:
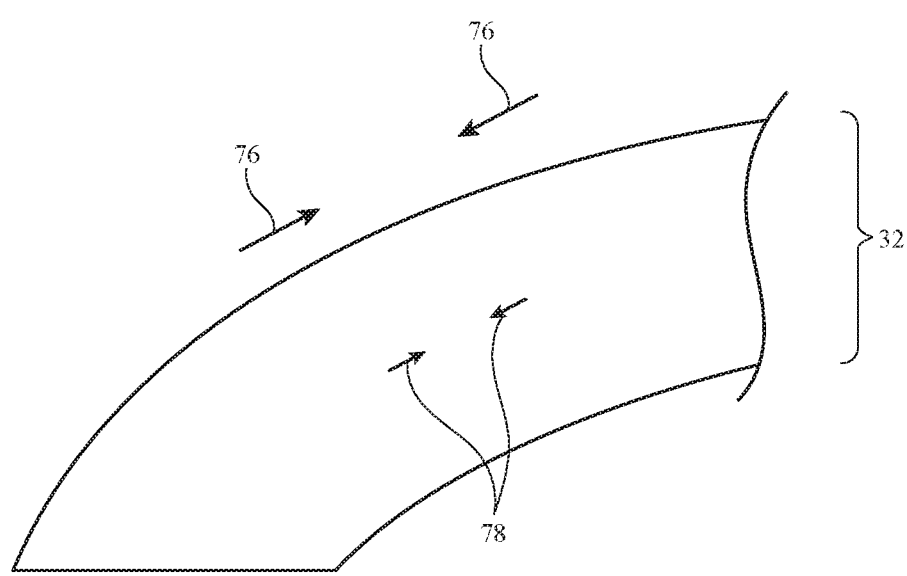
FIG. 18 is a cross-sectional side view of a display cover layer with an illustrative compressive stress profile to help strengthen the display cover layer in accordance with an embodiment.

FIG. 18 shows how some or all of layer 32 may be processed to resist cracks. In particular, thermal tempering and/or chemical strengthening processes (e.g., a glass ion exchange process) may be used to strengthen layer 32. As an example, layer 30 may be processed so that one or both of the outer surfaces of layer 30 (e.g., the outermost surface of layer 30) exhibits more compressive stress (see, e.g., compressive stress 76 of FIG. 18) than the middle of layer 30 (which may have tensile stress or may have compressive stress of a smaller magnitude such as compressive stress 78) and/or layer 16 may be processed so that the one or both of the outer surfaces of layer 16 (e.g., the output surface of layer 16) exhibits more compressive stress than the middle of layer 16. The elevated compressive stresses at the surfaces of layers 30 and/or 16 may help prevent cracking.

Figure 19:
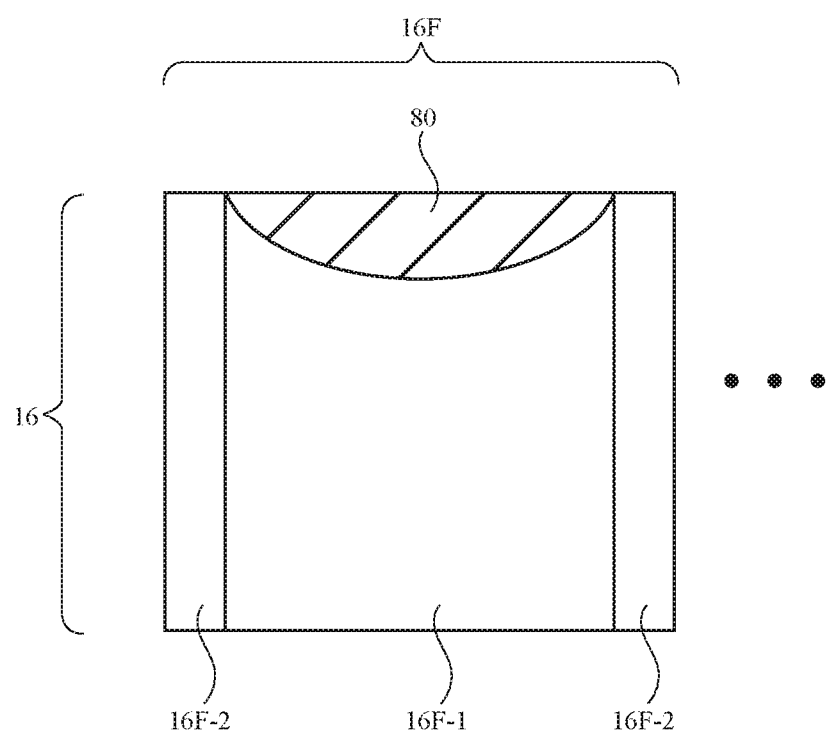
FIG. 19 is a cross-sectional side view of an image transport layer having selectively hardened areas in accordance with an embodiment.

In the illustrative arrangement of FIG. 19, layer 16 has been processed so that a hard material such as material 80 covers fiber cores 16F-1 on the output surface of layer 16. This type of image transport layer may be formed by applying etchant to fibers 16F in layer 16 that etches concave domes in the exposed tips of fiber cores 16F-1 followed by backfilling these recesses (and polishing, if desired). The material that is used to backfill the recesses in the exposed tips of fibers 16F may be harder than the material of cores 16F-1. For example, if cores 16-1 are formed from polymer, material 80 may be formed from a substance with a higher elastic modulus than the polymer (e.g., glass, inorganic dielectric, rigid polymer, and/or other rigid material). This type of treatment may help enhance the scratch resistance of layer 16 and thereby help allow layer 16 to be used as the outermost layer in layer 32 (e.g., so that protective layer 30 may be omitted). Surface treatments such as the illustrative surface treatments of FIGS. 18 and 19 may be used in display cover layers that include or that do not include crack-arresting regions such as region 62.

As described above, one aspect of the present technology is the gathering and use of information such as sensor information. The present disclosure contemplates that in some instances, data may be gathered that includes personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of information that may include personal information data to implement one or more various disclosed embodiments, the present disclosure also contemplates that the various embodiments can also be implemented without the need for accessing personal information data. That is, the various embodiments of the present technology are not rendered inoperable due to the lack of all or a portion of such personal information data.

The foregoing is merely illustrative and various modifications can be made to the described embodiments. The foregoing embodiments may be implemented individually or in any combination.

What is claimed is:

1. An electronic device, comprising:
a display configured to produce an image; and
a coherent fiber bundle layer that overlaps the display and that is configured to receive the image at an input surface and to transport the received image to an output surface, wherein the coherent fiber bundle layer has fibers joined by binder and wherein the coherent fiber bundle layer has a peripheral ring-shaped crack-arresting region.

2. The electronic device defined in claim 1 wherein the binder has a reduced modulus of elasticity in the peripheral ring-shaped crack-arresting region relative to other regions of the coherent fiber bundle layer.

3. The electronic device defined in claim 2 wherein the fibers have cores and wherein tips of the cores have concave recesses filled with transparent material.

4. The electronic device defined in claim 1 wherein the fibers in the coherent fiber bundle layer comprise fiber cores with a first diameter and fiber cores with a second diameter that is different than the first diameter.

5. The electronic device defined in claim 1 further comprising a glass protective layer overlapping the coherent fiber bundle layer and an adhesive layer between the glass protective layer and the coherent fiber bundle layer.

6. The electronic device defined in claim 1 wherein the coherent fiber bundle layer has a rectangular shape, and the peripheral ring-shaped crack-arresting region has a rectangular ring shape that surrounds a central portion of the coherent fiber bundle layer.

7. The electronic device defined in claim 1 wherein the coherent fiber bundle layer comprises a portion at the output surface that exhibits more compressive stress than an inner portion of the coherent fiber bundle layer.

8. The electronic device defined in claim 1 wherein at least some fibers in the coherent fiber bundle layer have serpentine shapes and have at least three bends.

9. An electronic device, comprising:
a display configured to produce an image; and
a display cover layer that overlaps the display, wherein the display cover layer comprises a coherent fiber bundle layer that overlaps the display and that is configured to receive the image at an input surface and to transport the received image to an output surface, wherein the display cover layer comprises a peripheral ring-shaped crack-arresting region, and wherein the display cover layer comprises a structure that has a first modulus of elasticity in the peripheral ring-shaped crack-arresting region and that has a second modulus of elasticity that is greater than the first modulus of elasticity in other regions of the display cover layer.

10. The electronic device defined in claim 9 wherein the structure comprises binder and wherein the coherent fiber bundle has fibers that are joined by the binder.

11. The electronic device defined in claim 9 wherein the structure comprises a protective glass layer having a recess in the peripheral ring-shaped crack-arresting region that is filled with polymer to arrest crack propagation through the protective glass layer.

12. The electronic device defined in claim 9 wherein the structure comprises a protective layer that overlaps the coherent fiber bundle layer, wherein the peripheral ring-shaped crack-arresting region is in the protective layer.

13. The electronic device defined in claim 12 wherein the peripheral ring-shaped crack-arresting region is in the coherent fiber bundle layer.

14. The electronic device defined in claim 12 wherein the structure comprises an adhesive having the first modulus of elasticity.

15. An electronic device, comprising:
a display configured to produce an image; and
an image transport layer configured to receive the image at an input surface and to transport the received image to an output surface, wherein the image transport layer has a crack-arresting region, wherein the image transport layer comprises a coherent fiber bundle having fibers joined together using binder and wherein the binder has a first modulus of elasticity in the crack-arresting region and has a second modulus of elasticity that is greater than the first modulus of elasticity elsewhere on the image transport layer.

16. The electronic device defined in claim 15 wherein the crack-arresting region comprises a peripheral ring-shaped crack-arresting region.

17. The electronic device defined in claim 15 wherein the image transport layer has a rectangular shape and wherein the peripheral ring-shaped crack-arresting region has a rectangular ring shape that surrounds a central portion of the image transport layer in which the binder has the second modulus of elasticity.

18. The electronic device defined in claim 17 wherein the fibers comprise fiber cores formed from a first material, wherein the fiber cores have concave dome-shaped recesses, and wherein the fibers comprise a second material that is different from the first material in the concave dome-shaped recesses.

19. The electronic device defined in claim 15 further comprising a protective glass layer that overlaps the image transport layer.

20. The electronic device defined in claim 19 wherein the protective glass layer has a recess in the crack-arresting region that is filled with polymer to arrest crack propagation through the protective glass layer.

* * * * *